United States Patent
Liu et al.

(10) Patent No.: US 12,475,029 B2
(45) Date of Patent: Nov. 18, 2025

(54) TEST METHOD, SYSTEM, AND DEVICE BASED ON EXCEL FILE LOADING

(71) Applicant: SHANGHAI TOSUN TECHNOLOGY LTD., Shanghai (CN)

(72) Inventors: Chu Liu, Shanghai (CN); Yueyin Xie, Shanghai (CN); Mang Mo, Shanghai (CN)

(73) Assignee: SHANGHAI TOSUN TECHNOLOGY LTD., Shanghai (CN)

(*) Notice: Subject to any disclaimer, the term of this patent is extended or adjusted under 35 U.S.C. 154(b) by 0 days.

(21) Appl. No.: 18/267,127

(22) PCT Filed: Sep. 5, 2022

(86) PCT No.: PCT/CN2022/116978
§ 371 (c)(1),
(2) Date: Jun. 14, 2023

(87) PCT Pub. No.: WO2023/093198
PCT Pub. Date: Jun. 1, 2023

(65) Prior Publication Data
US 2024/0118994 A1    Apr. 11, 2024

(30) Foreign Application Priority Data
Nov. 29, 2021  (CN) .......................... 202111447914.9

(51) Int. Cl.
G06F 9/44 (2018.01)
G06F 11/3668 (2025.01)
G06F 11/3698 (2025.01)

(52) U.S. Cl.
CPC ...... *G06F 11/3698* (2025.01); *G06F 11/3684* (2013.01); *G06F 11/3688* (2013.01)

(58) Field of Classification Search
CPC .................................................. G06F 11/3698
USPC .......................................................... 717/124
See application file for complete search history.

(56) References Cited

U.S. PATENT DOCUMENTS

| | | | |
|---|---|---|---|
| 2003/0052917 A1 | 3/2003 | Dubovsky et al. | |
| 2003/0131290 A1 | 7/2003 | Weinberg et al. | |
| 2008/0010543 A1* | 1/2008 | Yamamoto | G06F 11/3688 714/38.1 |
| 2011/0265175 A1 | 10/2011 | Bhat | |
| 2013/0074043 A1* | 3/2013 | Fu | G06F 11/3684 717/125 |
| 2016/0306690 A1* | 10/2016 | Underseth | G06F 11/263 |
| 2020/0110696 A1* | 4/2020 | Liegard | G06F 11/3692 |

FOREIGN PATENT DOCUMENTS

| | | |
|---|---|---|
| CN | 102360212 A | 2/2012 |
| CN | 103218290 A | 7/2013 |
| CN | 105955887 A | 9/2016 |

(Continued)

*Primary Examiner* — Evral E Bodden
(74) *Attorney, Agent, or Firm* — Bayramoglu Law Offices LLC (57) ABSTRACT

A test method based on Excel file loading includes: editing an Excel test case; and testing the Excel test case. In this way, a test script is implemented based on an Excel file, and it is only required to modify the Excel file to modify the test script, thereby preventing a program from being frequently modified in a process of changing the script, and improving a parameterization capability of a test system.

5 Claims, 2 Drawing Sheets

(56) References Cited

FOREIGN PATENT DOCUMENTS

| | | | |
|---|---|---|---|
| CN | 106598869 A | | 4/2017 |
| CN | 106874207 A | | 6/2017 |
| CN | 104636254 B | | 7/2017 |
| CN | 107679027 A | | 2/2018 |
| CN | 107729243 A | | 2/2018 |
| CN | 109359052 A | | 2/2019 |
| CN | 110096444 A | | 8/2019 |
| CN | 111143192 A | | 5/2020 |
| CN | 112231197 A | * | 1/2021 |
| CN | 112667512 A | | 4/2021 |
| CN | 114116498 A | | 3/2022 |
| JP | H07306801 A | | 11/1995 |
| JP | 2008135008 A | | 6/2008 |
| JP | 2010218496 A | | 9/2010 |
| JP | 2014115884 A | | 6/2014 |

\* cited by examiner

| Execution Action | Operation Content | Parameter |
|---|---|---|
| [1] Defining a test step | Normal step/ test termination step | None |
| [2] Defining a test variable | Variable name | Type\|initial value |
| [3] Calling a function and returning an error code | System function name inside a test system | Parameter 1\|parameter 2 \|...\|parameter N |
| [4] Checking a last error code | Setting a variable/exiting a test | Variable name |
| [5] Checking a variable range and returning an error code | Variable name | Low threshold\|high threshold |

FIG. 4

TEST METHOD, SYSTEM, AND DEVICE BASED ON EXCEL FILE LOADING

CROSS-REFERENCE TO RELATED APPLICATIONS

This application is the national phase entry of International Application No. PCT/CN2022/116978, filed on Sep. 5, 2022, which is based upon and claims priority to Chinese Patent Application No. 202111447914.9, filed on Nov. 29, 2021, the entire contents of which are incorporated herein by reference.

TECHNICAL FIELD

The present disclosure relates to the technical field of an automobile test system, and specifically, to a test method, system, and device based on Excel file loading.

BACKGROUND

A general test system is typically divided into a test system running environment and a test script. The test script may be arbitrarily edited by a tester based on a test requirement. The test script is generally implemented in a specific programming language, such as a C language, a C# language, a Python language, or a visual basic (VB) script language.

In the test script, the tester can define test logic and test parameters. If required, the test logic and the test parameters are often compiled and changed by a test system developer based on the test requirements by editing and compiling the test script. Therefore, the editing of the test script involves modification of a program code corresponding to the test script, which results in the problems such as tight binding between test system development and program development, dependency of script modification on a professional, and low efficiency of modifying the test logic and the test parameter.

Therefore, to resolve the above technical problems, a new test method, system, and device based on Excel file loading need to be designed.

SUMMARY

The present disclosure is intended to provide a test method, system, and device based on Excel file loading.

To resolve the above technical problem, the present disclosure provides a test method based on Excel file loading, including:
editing an Excel test case; and
testing the Excel test case.
Further, a method for editing the Excel test case includes:
using a test case viewing and editing device to create an Excel file, load the Excel file, display detailed information of the test case to a tester, and edit the test case, where
when an Excel program is started, the Excel file created by using the test case viewing and editing device is opened, where each sheet of the Excel file is a test case, and each test case includes a test step, a name, a description, an execution action, an operation content, a parameter, and an annotation.
Further, the Excel test step column in the Excel file sequentially defines an identifier of a step of a current test case;
the Excel name column in the Excel file defines a displayed name of the step;
the Excel description column in the Excel file defines a descriptive text of the current step, and the descriptive text is displayed in the test case viewing and editing device;
the Excel execution action column in the Excel file defines a specific action to be executed by a test system for the current step;
the Excel operation content column in the Excel file defines content information for action execution of the current step;
the Excel parameter column in the Excel file defines parameter information on which the action execution of the current step depends; and
the Excel annotation column in the Excel file defines annotative information of the current step.
Further, a method for testing the Excel test case includes:
executing the Excel test case by using a test case executor, and writing a test result into an Excel result file in an execution process to generate a test report, where
during running, the test case executor loads and displays content of the Excel file, executes test cases one by one, displays the test result, and generates the test report successively;
after the Excel test case is tested, the Excel program displays the test report after being started, where a test report file includes a plurality of sheets, and each of the sheets represents a report of one test case; and
each report includes a test result, a test step, a name, a description, an execution action, an operation content, a parameter, and an annotation.
Further, the test result column in the report contains a verdict result of the current test step, namely, successful test (OK), failed test (NOK), or conditional success of the test (COK);
the Excel test step column in the report sequentially defines the identifier of the step of the current test case;
the Excel name column in the report defines the displayed name of the step;
the Excel description column in the report defines the descriptive text of the current step, and the descriptive text is displayed in the test case viewing and editing device;
the Excel execution action column in the report defines the specific action to be executed by the test system for the current step;
the Excel operation content column in the report defines the content information for the action execution of the current step;
the Excel parameter column in the report defines the parameter information on which the action execution of the current step depends; and
the Excel annotation column in the report defines the annotative information of the current step.
Further, execution types of the test case include: an execution action type, an operation content type, and a parameter type;
the execution action type includes: defining a test step, defining a test variable, calling a function and returning an error code, checking a last error code, and checking a variable range and returning an error code; and
content in the operation content type and the parameter type one-to-one corresponds to entries in the execution action type.
Further, the action of defining the test step is represented by a string, where when the string is read, if content of the string is the same as a preset step string, it is determined that this row is a definition of one test step, and in this case, content of the "Test Step", "Name", and "Description" columns is valid; or if content of the string is different from a preset step string, content of the "Test Step", "Name", and "Description" columns is invalid, and the "Test Step", "Name", and "Description" columns need to be left blank;

operation content corresponding to the action of defining the test step includes: a normal step and a test termination step;

the normal step is a routine test step, and when a test process is terminated early due to an error or another reason, all normal steps are skipped and the test termination step is executed directly, where the test termination step is at the end of all test steps;

a parameter corresponding to the action of defining the test step does not exist and should be left blank;

the action of defining the test variable is represented by a string, where when the string is read, if content of the string is the same as a preset variable string, it is determined that this row is a definition of one variable, and a new variable is requested based on other information in this row;

operation content corresponding to the action of defining the test variable is a variable name, and any string representing an identifier is input as the defined variable name;

a parameter corresponding to the action of defining the test variable is a string containing two fields: a variable type and an initial value, where the fields are separated by a character "|";

the action of calling the function and returning the error code is represented by a string, where when the string is read, if content of the string is the same as a preset function string, it is determined that this row is a function call of the test system, and the test system searches for a corresponding function based on a function name and calls the function based on the parameter defined in this row;

operation content corresponding to the action of calling the function and returning the error code is the function name;

a parameter corresponding to the action of calling the function and returning the error code is a string containing 0 or a plurality of fields, where each of the fields corresponds to one parameter value, and the fields are separated by the character "|";

the action of checking the last error code is represented by a string, where when the string is read, if content of the string is the same as a preset check string, it is determined that this row is an error code detection operation, and after an error is detected, based on a definition of operation content of this row, an operation of writing error information into a specific variable or exiting the test process is performed;

the operation content corresponding to the action of checking the last error code includes: setting a variable and exiting a test, where the setting a variable means that after an error occurs in the test, error information is written into the corresponding variable, and the test continues; and the exiting a test means that after the error occurs in the test, the test system immediately jumps to the test termination step and the test termination is implemented to terminate the test;

a parameter corresponding to the action of checking the last error code is valid only when the operation content is to set the variable, indicating a name of the variable to be written, and when the operation content is to exit the test, the parameter cell should be left blank;

the action of checking the variable range and returning the error code is represented by a string, where when the string is read, if content of the string is the same as a preset variable string, it is determined that this row is testing and determining of variable detection, and upper and lower limits of the detection and a corresponding variable are defined in other columns of this row;

operation content corresponding to the action of checking the variable range and returning the error code is a name of the detected variable; and a parameter corresponding to the action of checking the variable range and returning the error code is a string containing two fields, namely, a low threshold and a high threshold, where each of the thresholds corresponds to one parameter value, and the fields are separated by the character "|".

According to a second aspect, the present disclosure further provides a test system based on Excel file loading, including:

an editing module configured to edit an Excel test case; and a test module configured to test the Excel test case.

According to a third aspect, the present disclosure further provides a test device based on Excel file loading, including:

an Excel test case editing module, an Excel test case execution module, and an Excel test case execution action classification module, where the Excel test case editing module is adapted to edit an Excel test case;

the Excel test case execution action classification module is adapted to define a test operation executed by the Excel test case execution module; and the Excel test case execution module is adapted to test the Excel test case based on the defined test operation.

The present disclosure has following beneficial effects: The present disclosure edits an Excel test case, and tests the Excel test case. In this way, a test script is implemented based on an Excel file, and it is only required to modify the Excel file to modify the test script, thereby preventing a program from being frequently modified in a process of changing the script, and improving a parameterization capability of a test system.

Other features and advantages of the present disclosure will be described in the following description, and some of these will become apparent from the description or be understood by implementing the present disclosure. The objectives and other advantages of the present disclosure can be implemented or obtained by structures specifically indicated in the description and accompanying drawings.

In order to make the above purposes, features, and advantages of the present disclosure clearer and more understandable, the present disclosure is described in detail below using preferred embodiments with reference to the accompanying drawings.

BRIEF DESCRIPTION OF THE DRAWINGS

To describe the technical solutions in the specific implementations of the present disclosure or the prior art more clearly, the accompanying drawings required for describing the specific implementations or the prior art are briefly described below. Apparently, the accompanying drawings in the following description show merely some implementa

DETAILED DESCRIPTION OF THE EMBODIMENTS

In order to make the objectives, technical solutions, and advantages of the embodiments of the present disclosure clearer, the technical solutions in the present disclosure are described clearly and completely below with reference to the accompanying drawings. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Figure 1:
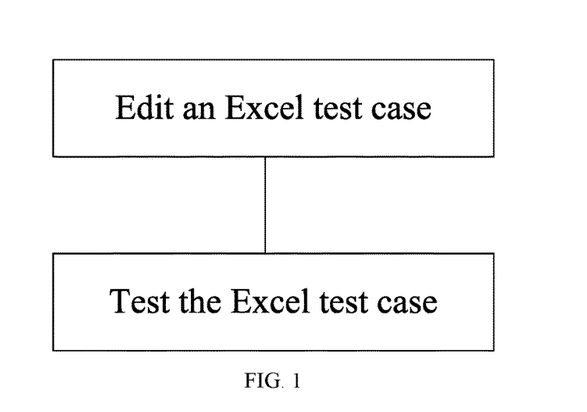
- FIG. 1 is a flowchart of a test method based on Excel file loading according to the present disclosure.

As shown in FIG. 1, an embodiment provides a test method based on Excel file loading, including: editing an Excel test case; and testing the Excel test case. This resolves technical problems such as poor readability and editability of a traditional test program. A test script is implemented based on an Excel file, and it is only required to modify the Excel file to modify the test script, thereby preventing a program from being frequently modified in a process of changing the script, and improving a parameterization capability of a test system. Tedious script development and modification in a traditional test system are abstracted into reading and writing of the Excel file, such that a tester can compile and modify the test script in Excel without mastering any programming language. This decouples development of the test system and the test script, which improves development efficiency of the test script, and reduces a development difficulty of the test script. The test system in the present disclosure can reduce dependence on a programming level of the tester.

Figure 2:
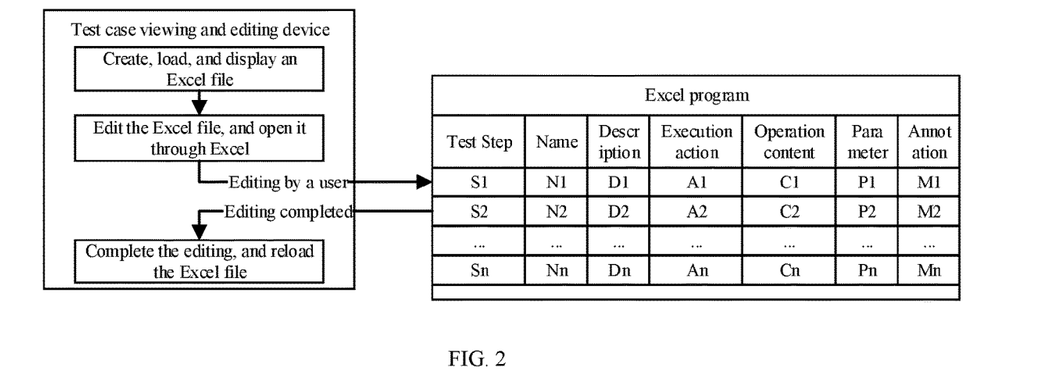
FIG. 2 is a schematic diagram of editing an Excel test case according to the present disclosure.

As shown in FIG. 2, in this embodiment, a method for editing the Excel test case includes: creating the Excel file by using a test case viewing and editing device, loading the Excel file, displaying detailed information of the test case to the tester, and editing the test case. An Excel program is used by the tester to edit the test case. When the Excel program is started, the Excel file created by using the test case viewing and editing device is opened. Each sheet of the Excel file is a test case, and each test case includes a test step, a name, a description, an execution action, an operation content, a parameter, and an annotation.

In this embodiment, the Excel test step column in the Excel file sequentially defines an identifier of a step of a current test case, for example, "1", "2", "1.1", or "1.2". The Excel name column in the Excel file defines a displayed name of the step, for example, "Test Step 1" or "Power Up". The Excel description column in the Excel file defines a descriptive text of the current step, and the descriptive text is displayed in the test case viewing and editing device. The Excel execution action column in the Excel file defines a specific action to be executed by the test system for the current step, and details of the action are shown in FIG. 4.

Figure 4:
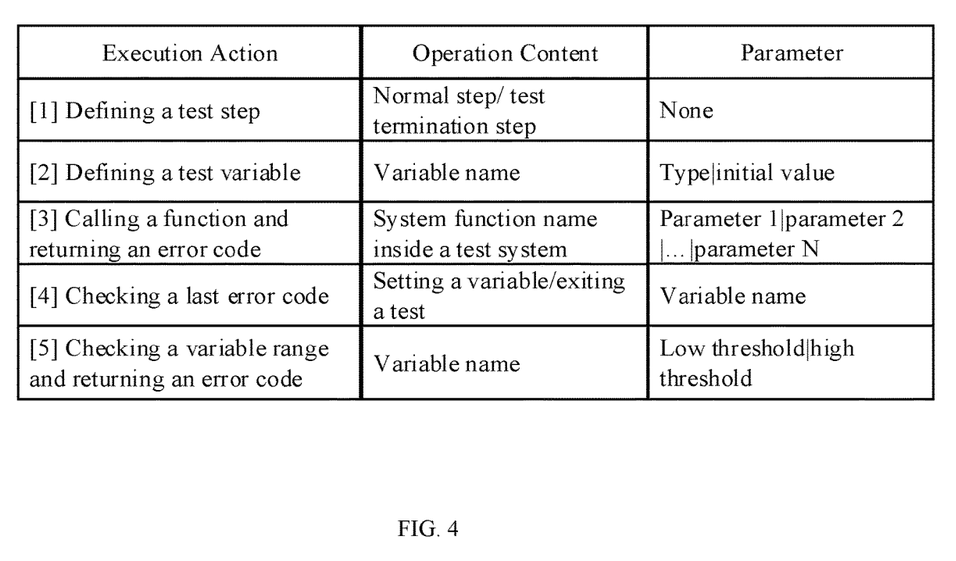
FIG. 4 is a schematic diagram of execution action classification of an Excel test case according to the present disclosure.

The Excel operation content column in the Excel file defines content information for action execution of the current step, and details of the information are shown in FIG. 4. The Excel parameter column in the Excel file defines parameter information on which the action execution of the current step depends, and details of the parameter information are shown in FIG. 4. The Excel annotation column in the Excel file defines annotative information of the current step.

Figure 3:
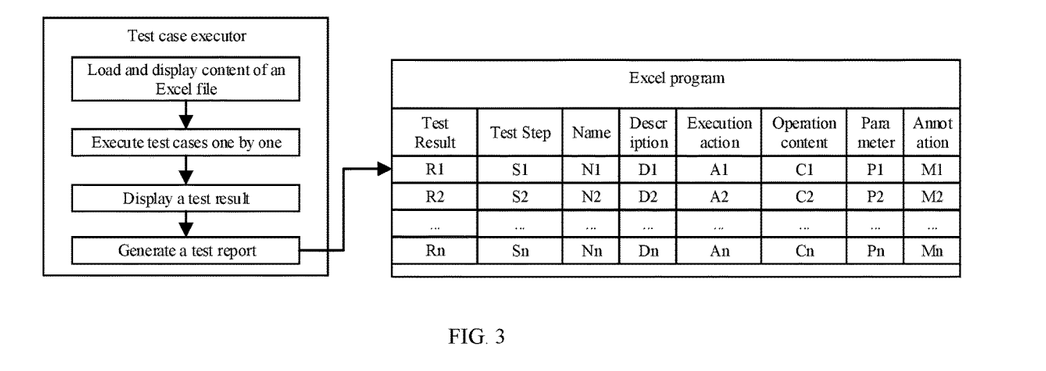
FIG. 3 is a schematic diagram of running an Excel test case according to the present disclosure.

As shown in FIG. 3, in this embodiment, a method for testing the Excel test case includes: executing the Excel test case by using a test case executor, and writing a test result into an Excel result file in an execution process to generate a test report. After the test, a user can start the Excel program to view the test report. During running, the test case executor loads and displays content of the Excel file, executes test cases one by one, displays the test result, and generates the test report successively. After the Excel test case is tested, the Excel program displays the test report after being started. A test report file includes a plurality of sheets, and each of the sheets represents a report of one test case. Each report includes a test result, a test step, a name, a description, an execution action, an operation content, a parameter, and an annotation.

In this embodiment, the test result column in the report contains a verdict result of the current test step, namely, OK, NOK, or COK. The Excel test step column in the report sequentially defines the identifier of the step of the current test case, for example, "1", "2", "1.1", or "1.2". The Excel name column in the report defines the displayed name of the step, for example, "Test Step 1" or "Power Up". The Excel description column in the report defines the descriptive text of the current step, and the descriptive text is displayed in the test case viewing and editing device. The Excel execution action column in the report defines the specific action to be executed by the test system for the current step, and the details of the action are shown in FIG. 4. The Excel operation content column in the report defines the content information for the action execution of the current step, and the details of the information are shown in FIG. 4. The Excel parameter column in the report defines the parameter information on which the action execution of the current step depends, and the details of the parameter information are shown in FIG. 4. The Excel annotation column in the report defines the annotative information of the current step.

As shown in FIG. 4, in this embodiment, execution types of the test case include: an execution action type, an operation content type, and a parameter type. The execution action type includes: defining a test step, defining a test variable, calling a function and returning an error code, checking a last error code, and checking a variable range and returning an error code. Content in the operation content type and the parameter type one-to-one corresponds to entries in the execution action type.

In this embodiment, the action of defining the test step is represented by a string, including but not limited to string "define_test_step". When the test system reads the cell, if content of the cell is the same as the preset step string "define_test_step", it is determined that this row is a definition of one test step, and in this case, content of the "Test Step", "Name", and "Description" columns is valid; or if content of the cell is different from the preset step string, content of the "Test Step", "Name", and "Description" columns is invalid, and the "Test Step", "Name", and "Description" columns need to be left blank.

Operation content corresponding to the action of defining the test step includes a normal step (normal_step) and a test termination step (test_tear_down). The normal step is a routine test step. When a test process is terminated early due to an error or another reason, all normal steps are skipped and the test termination step is executed directly. The test termination step is at the end of all test steps. A parameter corresponding to the action of defining the test step does not exist and should be left blank.

The action of defining the test variable is represented by a string, including but not limited to string "define_variable". When the test system reads the cell, if content of the cell is the same as the preset variable string "define_variable", it is determined that this row is a definition of one variable, and a new variable is requested based on other information in this row.

Operation content corresponding to the action of defining the test variable is a variable name, and any string representing an identifier can be input as the defined variable name.

A parameter corresponding to the action of defining the test variable is a string containing two fields: a variable type and an initial value, where the fields are separated by a character "|". For example, if a variable of a double type has an initial value of 3.5, the parameter herein is "double|3.5".

The action of calling the function and returning the error code is represented by a string, including but not limited to string "call_function". When the test system reads the cell, if content of the cell is the same as the preset function string "call_function", it is determined that this row is a function call of the test system, and the test system searches for a corresponding function based on a function name and calls the function based on the parameter defined in this row.

Operation content corresponding to the action of calling the function and returning the error code is the function name. An existing function name in the test system may be input herein.

A parameter corresponding to the action of calling the function and returning the error code is a string containing 0 or a plurality of fields, where each of the fields corresponds to one parameter value, and the fields are separated by the character "|". For example, if a function has two parameters of the double type, namely, 3.5 and 5.6, the parameter herein is "3.5|5.6".

The action of checking the last error code is represented by a string, including but not limited to string "check_last_error". When the test system reads the cell, if content of the cell is the same as the preset check string "check_last_error", it is determined that this row is an error code detection operation, and after an error is detected, based on a definition of operation content of this row, an operation of writing error information into a specific variable or exiting the test process is performed.

The operation content corresponding to the action of checking the last error code includes but is not limited to two types: setting a variable (set_variable) and exiting the test (exit_on_fail). The setting a variable means that after an error occurs in the test, error information is written into the corresponding variable, and the test continues; and the exiting the test means that after the error occurs in the test, the test system immediately jumps to the test termination step and the test termination is implemented to terminate the test.

A parameter corresponding to the action of checking the last error code is valid only when the operation content is to set the variable, indicating a name of the variable to be written. When the operation content is to exit the test, the parameter cell should be left blank.

The action of checking the variable range and returning the error code is represented by a string, including but not limited to string "check_var_range". When the test system reads the cell, if content of the cell is the same as the preset variable string "check_var_range", it is determined that this row is testing and determining of variable detection, and upper and lower limits of the detection and a corresponding variable are defined in other columns of this row.

Operation content corresponding to the action of checking the variable range and returning the error code is a name of the detected variable.

A parameter corresponding to the action of checking the variable range and returning the error code is a string containing two fields, namely, a low threshold and a high threshold, where each of the thresholds corresponds to one parameter value, and the fields are separated by the character "|". For example, if it is necessary to determine that the variable is between 3.5 and 5.6, the parameter herein is "3.5|5.6". If it is necessary to determine that the variable is equal to 3.5, the parameter herein is "3.5|3.5". A task of building the test system is divided into two subtasks. In this way, a professional developer can focus on designing an architecture and an API of the test system, while the tester can focus on setting the test script and the parameter, such that these two subtasks can be carried out simultaneously. This simplifies design of the test system, improves the development efficiency of the test system, and reduces the development difficulty of the test system.

Specifically, an embodiment provides a test case and system for message sending based on Excel file loading. An Excel file includes a test step column, a name column, a description column, an execution action column, an operation content column, a parameter column, and an annotation column. The test case and system for message sending include the Excel file, a test case viewing and editing device that loads the Excel file, and a test case executor that executes the Excel file.

As shown in Table 1, the Excel file contains one case that is intended to connect a bus tool, send one frame of a CAN message to a tested system, determine whether the message is successfully sent, and finally disconnect the bus tool.

As shown in Table 1, an execution action in a first row is "define_test_step", which means defining a test step. In this row, a step number is 1; a step name is "Connect"; a description is "Connect hardware", which means connecting the bus tool; and operation content is "normal_step", indicating that this step is a normal step.

As shown in Table 1, an execution action in a second row is "define_variable", which means defining a variable. Operation content is variable name "vTransmitResult"; and a parameter is "double|0", where a variable type is double and an initial value is 0.

As shown in Table 1, an execution action in a third row is "call_function", which means calling a system function. Operation content is function name "app. connect", which means connecting a bus tool. A parameter is left blank because the function requires no parameter. If the function is successfully executed, a value 1 is returned; otherwise a value 0 is returned.

As shown in Table 1, an execution action in a fourth row is "check_last_error", which means detecting a last error. Operation content is "exit_on_fail", which means that if a last operation fails, a test is immediately exited. This action requires no parameter because the operation content is "exit_on_fail".

As shown in Table 1, an execution action in a fifth row is "define_test_step", which means defining a test step. In this row, a step number is 2; a step name is "Transmit"; a description is "Msg. Transmit", which means sending a message; and operation content is "normal_step", indicating that this step is a normal step.

As shown in Table 1, an execution action in a sixth row is "call_function", which means calling a system function. Operation content is function name "com.transmit_can", which means sending a CAN message. This function requires one parameter, namely, a CAN message pointer, so required message MSG1 is given in a parameter column.

As shown in Table 1, an execution action in a seventh row is "check_last_error", which means detecting a last error. Operation content is "set_variable", which means that when an error is detected, error information is written into a variable. A parameter is "vTransmitResult", indicating a name of the variable to be written.

As shown in Table 1, an execution action in an eighth row is "check_var_range", which means detecting whether a detected variable is within a range. Operation content is "vTransmitResult", which means that a name of the detected variable is "vTransmitResult". A parameter is "1|1", which means detecting whether the variable is 1.

As shown in Table 1, an execution action in a ninth row is "define_test_step", which means defining a test step. In this row, a step number is 3; a step name is "Disconnect"; a description is "Disconnect Hardware", which means disconnecting the bus tool; and operation content is "test_tear_down", indicating that this step is a test termination step. If the previous step exits during the execution, this step is executed unconditionally. This step requires no parameter.

As shown in Table 1, an execution action in a tenth row is "call_function", which means calling a system function. Operation content is function name "app.disconnect", which means disconnecting the bus tool. The function requires no parameter.

As shown in Table 1, after loading this file, the test case viewing and editing device provides a user with a test script viewing function. After loading this file, the test case executor executes tests row by row from top to bottom based on the content defined in the Excel file.

As shown in Table 1, to modify content of the sent message, the tester only needs to open the Excel file and modify content in a cell in which MSG1 is located. To add a new to-be-sent message, the tester only needs to open the Excel file, add a new row in the step 2, and edit the row based on the execution action of "call_function".

In this embodiment, the test system based on Excel file loading may further include: an Excel test case editing method, an Excel test case execution method, and an Excel test case execution classification. The Excel test case editing method may be composed of a test case viewing and editing device and an Excel program. The Excel test case execution method is composed of a test case executor and an Excel program. The test case execution classification is composed of execution action classification, operation content classification, and parameter classification.

In this embodiment, specific processes of the modules and the methods have been described in detail in the above test method based on Excel file loading.

An embodiment provides a test device based on Excel file loading, including an Excel test case editing module, an Excel test case execution module, and an Excel test case execution action classification module.

The Excel test case editing module is adapted to edit an Excel test case. The Excel test case execution action classification module is adapted to define a test operation executed by the Excel test case execution module. The Excel test case execution module is adapted to test the Excel test case based on the defined test operation.

In this embodiment, the test device based on Excel file loading is adapted to test the Excel test case using the above test method based on Excel file loading.

To sum up, the present disclosure edits an Excel test case, and tests the Excel test case. In this way, a test script is implemented based on an Excel file, and it is only required to modify the Excel file to modify the test script, thereby preventing a program from being frequently modified in a process of changing the script, and improving a parameterization capability of a test system.

In several embodiments provided in the present disclosure, it should be understood that the disclosed device and method may be implemented in other manners. The device embodiments described above are merely examples. For example, the flowcharts and block diagrams in the accompanying drawings show the possible implementation architecture, functions, and operations of the devices, methods, and computer program products according to multiple embodiments of the present disclosure. Each block in the flowcharts or block diagrams may represent a module, a program segment, or a part of code, and the module, the

TABLE 1

| Execution action types | | | | | | |
|---|---|---|---|---|---|---|
| Test Step | Test Step Name | Description | Operation | Operator Name | Parameters | Comment |
| 1 | Connect | Connect hardware | define_test_step | normal_step | | |
| | | | define_variable | vTransmitResult | double|0 | |
| | | | call_function | app.connect | | |
| | | | check_last_error | exit_on_fail | | |
| 2 | Transmit | Msg. Transmit | define_test_step | normal_step | | |
| | | | call_function | com.transmit_can | | MSG1 |
| | | | check_last_error | set_variable | | vTransmitResult |
| | | | check_var_range | vTransmitResult | 1|1 | |
| 3 | Disconnect | Disconnect Hardware | define_test_step | test_tear_down | | |
| | | | call_function | app.disconnect | | |

An embodiment provides a test system based on Excel file loading, including: an editing module configured to edit an Excel test case; and a test module configured to test the Excel test case.

program segment, or the part of code contains one or more executable instructions used to implement specified logical functions. It should also be noted that, in some alternative implementations, the functions marked in the blocks may alternatively occur in a different order from that marked in the drawings. For example, two consecutive blocks can actually be executed in parallel, or sometimes can be executed in the reverse order, depending on the functions involved. It should also be noted that each block in the flowcharts and/or block diagrams and combinations of the blocks in the flowcharts and/or block diagrams may be implemented by a dedicated hardware-based system for executing specified functions or operations, or may be implemented by a combination of dedicated hardware and computer instructions.

In addition, all functional modules in the embodiments of the present disclosure may be integrated into one independent part, or each of the modules may exist alone physically, or two or more modules may be integrated into one independent part.

The functions, if implemented in the form of a software functional module and sold or used as a stand-alone product, may be stored in a computer-readable storage medium. Based on such understanding, the technical solutions of the present disclosure essentially or the part contributing to the prior art may be implemented in a form of a software product. The computer software product may be stored in a storage medium, and includes several instructions for enabling a computer device (which may be a personal computer, a server, a network device, or the like) to perform all or some steps of the methods described in the embodiments of the present disclosure. The foregoing storage medium includes: any medium that can store program code, such as a USB flash disk, a removable hard disk, a read-only memory (ROM), a random access memory (RAM), a magnetic disk, or an optical disc.

Under the inspiration of the above ideal examples of the present disclosure, a skilled person can absolutely make various changes and modifications through the above description content without departing from the scope of the technical idea of the present disclosure. The technical scope of the present disclosure is not limited to the content of the description, which must be determined according to the scope of the claims.

What is claimed is:

1. A test method based on Excel file loading, comprising:
   editing an Excel test case, and
   testing the Excel test case,
   wherein a method for editing the Excel test case comprises:
   using a test case viewing and editing device to create an Excel file, load the Excel file, display detailed information of the Excel test case to a tester, and edit the Excel test case, wherein when an Excel program is started, the Excel file created by using the test case viewing and editing device is opened, wherein each sheet of the Excel file is a test case, and each test case comprises an Excel test step column, an Excel name column, an Excel description column, an Excel execution action column, an Excel operation content column, an Excel parameter column, and an Excel annotation column,
   wherein
   the Excel test step column in the Excel file sequentially defines an identifier of a step of a current test case;
   the Excel name column in the Excel file defines a displayed name of the step;
   the Excel description column in the Excel file defines a descriptive text of a current step, and the descriptive text is displayed in the test case viewing and editing device;
   the Excel execution action column in the Excel file defines a specific action to be executed by a test system for the current step;
   the Excel operation content column in the Excel file defines content information for action execution of the current step;
   the Excel parameter column in the Excel file defines parameter information, and the action execution of the current step depends on the parameter information; and
   the Excel annotation column in the Excel file defines annotative information of the current step.

2. The test method according to claim 1, wherein
   a method for testing the Excel test case comprises:
   executing the Excel test case by using a test case executor, writing a test result into an Excel result file in an execution process, and generating a test report, wherein
   during running, the test case executor loads and displays content of the Excel file, executes test cases one by one, displays the test result, and generates the test report successively;
   after the Excel test case is tested, the Excel program displays the test report after being started, wherein a test report file comprises a plurality of sheets, and each of the sheets represents a report of one test case; and
   each report comprises a test result column, an Excel test step column, an Excel name column, an Excel description column, an Excel execution action column, an Excel operation content column, an Excel parameter column, and an Excel annotation column.

3. The test method according to claim 2, wherein
   the test result column in the report contains a verdict result of a current test step;
   the Excel test step column in the report sequentially defines the identifier of the step of the current test case;
   the Excel name column in the report defines a displayed name of the step;
   the Excel description column in the report defines a descriptive text of the current test step, and the descriptive text is displayed in the test case viewing and editing device;
   the Excel execution action column in the report defines a specific action to be executed by the test system for the current test step;
   the Excel operation content column in the report defines content information for action execution of the test current step;
   the Excel parameter column in the report defines parameter information, and the action execution of the current test step depends on the parameter information; and
   the Excel annotation column in the report defines annotative information of the test current step.

4. The test method according to claim 3, wherein
   execution types of the test case comprise: an execution action type, an operation content type, and a parameter type;
   the execution action type comprises: defining a test step, defining a test variable, calling a function and returning a first error code, checking the first error code, and checking a variable range and returning a second error code; and
   content in the operation content type and the parameter type is in one-to-one correspondence to entries in the execution action type.

5. The test method according to claim 4, wherein
   an action of defining the test step is represented by a first string, wherein when the first string is read, if content of the first string is identical to a preset step string, it is determined that a first row where the first string is located is a definition of one test step, and in this case, content of the Excel test step column, the Excel name column, and the Excel description column is valid; or if the content of the first string is different from the preset step string, the content of the Excel test step column, the Excel name column, and the Excel description column is invalid and blank;

operation content corresponding to the action of defining the test step comprises: a normal step and a test termination step;

the normal step is a routine test step, and when a test process is terminated early due to an error or another reason, all normal steps are skipped and the test termination step is executed directly, wherein the test termination step is at the end of all test steps;

a first parameter corresponding to the action of defining the test step does not exist and is blank;

an action of defining the test variable is represented by a second string, wherein when the second string is read, if content of the second string is identical to a first preset variable string, it is determined that a second row where the second string is located is a definition of one variable, and a new variable is requested based on other information in the second row;

operation content corresponding to the action of defining the test variable is a variable name, and any string representing an identifier is input as the defined variable name;

a second parameter corresponding to the action of defining the test variable is a third string containing two fields: a variable type and an initial value, wherein the two fields are separated by a character "|";

an action of calling the function and returning the first error code is represented by a fourth string, wherein when the fourth string is read, if content of the fourth string is identical to a preset function string, it is determined that a third row where the fourth string is located is a function call of the test system, and the test system searches for a corresponding function based on a function name and calls the corresponding function based on a third parameter defined in the third row;

operation content corresponding to the action of calling the function and returning the first error code is the function name;

a fourth parameter corresponding to the action of calling the function and returning the first error code is a fifth string containing 0 or a plurality of fields, wherein each of the fields corresponds to one parameter value, and the fields are separated by the character "|";

an action of checking the first error code is represented by a sixth string, wherein when the sixth string is read, if content of the sixth string is identical to a preset check string, it is determined that a fourth row where the sixth string is located is an error code detection operation, and after an error is detected, based on a definition of operation content of the fourth row, an operation of writing error information into a specific variable or exiting the test process is performed;

operation content corresponding to the action of checking the first error code comprises: setting a variable and exiting a test, wherein in a process of setting the variable, after an error occurs in the test, the error information is written into the corresponding variable, and the test continues; and in a process of exiting the test, after the error occurs in the test, the test system immediately jumps to the test termination step and the test termination is implemented to terminate the test;

a fifth parameter corresponding to the action of checking the first error code is valid only when the operation content is to set the variable, indicating a name of the variable to be written, and when the operation content is to exit the test, a cell of the fifth parameter is blank;

an action of checking the variable range and returning the second error code is represented by a seventh string, wherein when the seventh string is read, if content of the seventh string is identical to a second preset variable string, it is determined that a fifth row where the seventh string is located is testing and determining of variable detection, and upper and lower limits of the variable detection and a corresponding variable are defined in other columns of the fifth row;

operation content corresponding to the action of checking the variable range and returning the second error code is a name of the detected variable; and a sixth parameter corresponding to the action of checking the variable range and returning the second error code is an eighth string containing two fields: a low threshold and a high threshold, wherein each of the low and high thresholds corresponds to one parameter value, and the two fields are separated by the character "|".

* * * * *